United States Patent
Benning

[15] 3,661,520
[45] May 9, 1972

[54] PRODUCTION OF BARIUM HYDROXIDE MONOHYDRATE

[72] Inventor: Bennie Le Roy Benning, Modesto, Calif.

[73] Assignee: FMC Corporation, New York, N.Y.

[22] Filed: July 13, 1970

[21] Appl. No.: 56,192

Related U.S. Application Data

[63] Continuation of Ser. No. 670,793, Sept. 26, 1967, abandoned.

[52] U.S. Cl. ................................................23/186, 23/187
[51] Int. Cl. ........................................................C01f 11/02
[58] Field of Search ..........................................23/186, 187

[56] References Cited

UNITED STATES PATENTS

| | | | |
|---|---|---|---|
| 3,082,066 | 3/1963 | Benning | 23/186 |
| 3,449,075 | 6/1969 | Goldstein et al. | 23/186 |

FOREIGN PATENTS OR APPLICATIONS

| | | | |
|---|---|---|---|
| 1,000,301 | 8/1965 | Great Britain | 23/186 |

OTHER PUBLICATIONS

Chemical Abstracts 55:24351i Nov. 27, 1961

*Primary Examiner*—Oscar R. Vertiz
*Assistant Examiner*—G. Alvaro
*Attorney*—Eugene G. Seema, Frank Ianno and Milton Zucker

[57] ABSTRACT

Discrete particles of commercial barium hydroxide monohydrate can be prevented from bonding together into hard, rock-like agglomerates by passing an inert sweep gas over the barium hydroxide monohydrate particles while maintaining them at elevated temperatures in a heating zone to remove substantially all residual water in excess of the stoichiometric amount required to form barium hydroxide monohydrate; the $Ba(OH)_2 \cdot H_2O$ assay of the resulting monohydrate product is thereby increased and higher hydrates of barium hydroxide are eliminated.

4 Claims, No Drawings

3,661,520

PRODUCTION OF BARIUM HYDROXIDE MONOHYDRATE

This application is a continuation of Ser. No. 670,793 filed Sept. 26, 1967, now abandoned.

BACKGROUND OF THE INVENTION

1. Field of the Invention

The invention relates to a process for producing barium hydroxide monohydrate which is free-flowing and which is substantially free of higher hydrates of barium hydroxide.

2. Description of the Prior Art

Barium hydroxide monohydrate is useful for producing additives in oil lubricants used in internal combustion engines. This material is reacted with various organic acids, e.g., alkyl benzene sulfonates, to form these additives. As a result of the dispersing properties of the organic additives, better lubrication by the oil is obtained, and the accumulation of hard residues on the internal walls of the engine is prevented.

At the present time, barium hydroxide monohydrate is employed extensively, compared with other hydrates of barium hydroxide for the above purposes. This is due, in part, to the high proportion by weight of barium hydroxide in barium hydroxide monohydrate compared with more highly hydrated forms of barium hydroxide. Another reason is that a particularly desirable barium hydroxide monohydrate product can be produced by the process described in U.S. Pat. No. 3,082,066 issued Mar. 19, 1963 in the names of Bennie Leroy Benning, et al. This barium hydroxide monohydrate is desirable because it has a low degree of "reactivity," wherein the "activity" is a measure of the exothermic reaction of the monohydrate with water. The exact reactivity rate and the method of determining this rate are set forth in the above-cited patent. In essence, this desirable barium hydroxide monohydrate product is produced by evaporating a thin film of a 50–66 percent barium hydroxide solution on a heated surface (225° F. to about 275° F.) whereby rapid removal of water is obtained to yield dried flakes of barium hydroxide monohydrate.

One difficulty that has been experienced in using the above barium hydroxide monohydrate is the tendency of these particles to bond together into hard, rock-like agglomerates when these particles remain standing either in storage or in shipping containers over prolonged periods. The bonding does not take place when the flakes are first placed in bins. It results when the flakes are pressed together, as in packaging and storage, and allowed to remain for a few weeks. This is a particularly aggravating phenomenon, since the barium hydroxide monohydrate flakes are free-flowing and easily handled when shipped in their containers from the plant, but by the time they arrive at their destination, and are unloaded several weeks later, the particles have bonded together into either rock-like agglomerates or into a solid agglomerated mass which is difficult to remove from the containers. Heretofore, the reason for this agglomeration of barium hydroxide monohydrate particles has not been known, and various measures taken to offset this agglomeration, e.g., addition of flow promoters, have not proved fruitful.

OBJECTS OF THE INVENTION

It is an object of the present invention to produce discrete particles of barium hydroxide monohydrate which remain free-flowing after storage and/or shipment.

It is a further object of the present invention to produce a barium hydroxide monohydrate product in the form of free-flowing, discrete particles having essentially no higher hydrate forms present.

It is another object of the present invention to produce a free-flowing barium hydroxide monohydrate which has a desirably low reactivity index suitable for use in forming oil additives.

These and other objects will be apparent from the following description.

SUMMARY OF THE INVENTION

We have now found that free-flowing, discrete particles of barium hydroxide monohydrate can be produced which remain free-flowing without agglomerating into rock-like masses on prolonged storage or standing by passing barium hydroxide monohydrate particles into a heated zone, heating the particles to a temperature of from about 100° to 140° C., and passing an inert, sweep gas over the heated particles to remove residual water in excess of the stoichiometric amount required to maintain the monohydrate form of barium hydroxide; the $Ba(OH)_2 \cdot H_2O$ assay of the resulting product is thereby increased (preferably to at least about 99 percent by weight of $Ba(OH)_2 \cdot H_2O$) and higher hydrates of barium hydroxide are eliminated.

DESCRIPTION OF THE INVENTION AND THE PREFERRED EMBODIMENTS

In carrying out the present invention, a conventional barium hydroxide monohydrate is first formed. One convenient method of producing a desirable barium hydroxide monohydrate having a low reactivity rate, as described in U.S. Pat. No. 3,082,066 described above, is to heat a solution of barium hydroxide containing from about 50–66 percent barium hydroxide to a temperature of 90°–110° C. This solution is then fed to a disperser which uniformly distributes the solution of barium hydroxide in a thin liquid layer on a smooth, heated surface wherein the layer of solution is no thicker than about 0.025 inches. The heated surface may be any means that can rapidly heat the thin film of barium hydroxide solution and drive off excess water. The heated surface normally is maintained at a temperature of about 107° to 135° C. (225° to 275° F.). When the water has been driven off, the resultant barium hydroxide monohydrate (assay about 97.5% $Ba(OH)_2 \cdot H_2O$) is removed from the heated surface as small flakes and generally has a particle distribution as follows:

7 to 11% +8 mesh
75 to 78% −8 +200 mesh.

In accordance with the present invention, the barium hydroxide monohydrate thus formed is placed in a heated zone and heated to a temperature of 100°–140° C. An inert, sweep gas is then passed over the particles of barium hydroxide monohydrate in the heated zone. The sweep gas, may for convenience sake, be air, nitrogen, helium or any gas which is nonreactive with barium hydroxide monohydrate. Where air is utilized, the $CO_2$ content of the air must be removed or kept extremely low, since $CO_2$ will react with the barium hydroxide monohydrate to form barium carbonate.

The function of the sweep gas is to remove residual water from the barium hydroxide monohydrate product in excess of the stoichiometric amount required to produce barium hydroxide monohydrate. By this technique, higher hydrates of barium hydroxide which are present in the product are converted to barium hydroxide monohydrate with the release of the excess water vapor. This treatment is continued until the excess water has been removed. Periods of about 1 to 30 minutes have been found effective in removing the water. As a result of this treatment, the resulting product normally has an assay of at least about 99 percent by weight $Ba(OH)_2 \cdot H_2O$. The remaining impurities which constitute less than 1 percent of the barium hydroxide monohydrate product are made up of trace amounts of barium carbonate, barium sulfate, and other such compounds.

In carrying out the above process the heating zone may be either a rotary kiln or a fluidized bed. In the case of a rotary kiln, the inert gas stream may be passed either cocurrently or countercurrently through the kiln, while the particles of barium hydroxide monohydrate are tumbled within the kiln. The rotary kiln may be heated by electrical resistance heating means or by burning gas and contacting the kiln with the hot combustion products. However, in the latter case, the combustion products must be kept out of contact with the sweep gas stream and the barium hydroxide monohydrate being treated within the kiln. This can be done by passing the hot combustion products around the outside of the kiln and obtaining indirect heat exchange through the walls of the kiln. Other methods of heating such as contacting the outside of the kiln with steam tubes or a heat transfer medium, e.g., Dowtherm, can also be employed.

In the case of a fluidized bed, an upflowing gas stream is used to suspend the particles in a container in a fluidized state. The fluidizing gas may act as the sweep gas, provided this gas is nonreactive with the barium hydroxide monohydrate being treated. The bed may be heated by using electrical resistance heating means placed within or about the bed or by passing heated gases, steam or a heat transfer liquid, e.g., Dowtherm, through jackets located around the outside wall of the fluidized reactor. Heating can also be achieved by heating the fluidizing gas which flows upwardly through the bed. In this latter case, the gas must not contain carbon dioxide or reaction products from any burning gases, since these will contaminate the product.

The rate of flow of the sweep gas is not critical, but it should be sufficient to remove the excess moisture within a practical, commercial operating time. The exact flow rate will depend also on the amount of monohydrate feed which is being treated and on the amount of water vapor which must be removed during this treatment.

The exact reason for the agglomeration and solidification of the barium hydroxide monohydrate particles after packaging or during storage is not known. The following theory is offered to explain the bonding phenomenon, but it is to be understood that the invention is not intended to be bound to this explanation or theory of operation.

It is believed that the undesired agglomeration and solidification is due to the presence of higher hydrates in the monohydrate product. More particularly, it is believed that a substantial amount of higher hydrates, particularly the tetrahydrate, are present, along with the monohydrate. A product reported as having an assay of 97 percent by weight $Ba(OH)_2 \cdot H_2O$ may contain as much as 4 to 10 percent of higher hydrates because the water may be held in the form of higher hydrates. These higher hydrates have higher water vapor pressures than the monohydrate. As a result, the higher hydrates tend to try to distribute their excess water to the monohydrate particles and in doing so the monohydrate flakes bond at their points of contact with one another on prolonged standing, as in packages or in storage.

By means of the present process, higher hydrates than the monohydrate are eliminated, and the resultant product is substantially free of residual water which can cause cementing and bonding of the monohydrate flakes at their points of contact with one another. As will be seen in the foregoing examples, the increase in $Ba(OH)_2 \cdot H_2O$ assay may be as little as 2 percent over conventional, commercial barium hydroxide monohydrate products. However, this may be sufficient to eliminate from 4 to 10 percent of the higher hydrates that commence the bonding and agglomeration of the remainder of the barium hydroxide monohydrate product. By removal of the higher hydrates, the barium hydroxide monohydrate has been found to be free of any tendency to agglomerate or bond even after prolonged storage.

The following example is given to illustrate the invention but is not intended to limit the scope thereof in any way.

EXAMPLE 1

A concentrated, aqueous solution of barium hydroxide, having a concentration of 62.3 percent by weight $Ba(OH)_2$, was heated to 100° C. and fed into the bottom of a splash pan of a steam-heated, twin-surfaced drier. The steam side temperature of the drier was maintained at 171° C. ±2° C. (340° F. ±3° F.). The temperature of the outside surface of the drier was maintained at about 121° C. (250° F.). A splasher located in the splash pan was run at about 400 r.p.m. to provide an even coating of barium hydroxide solution on the drier surface. The drying surfaces of the drier were rotated at 4 r.p.m. The product removed from the surface of the drier was dried flakes, which upon analysis of its barium content, assayed 97.4% $Ba(OH)_2 \cdot H_2O$ (or 88.3% $Ba(OH)_2$).

The above barium hydroxide monohydrate flakes were fed into a rotary kiln drier at a rate of about 30 pounds per square foot of heating area of the kiln per hour. The drier was heated by passing combustion gases around the outside of the kiln so that heat exchange was effected indirectly through the walls of the drier. The temperature of the kiln was adjusted so that the product discharged from the kiln at a temperature of 120° C. Dry air, containing no more than 0.03% $CO_2$, was passed into the drier as the sweep gas at a rate of 10 cubic foot per minute per square foot of cross sectional area in the drier. The residence time of the flakes going through the drier was about 8 minutes. The product removed from the drier had the following analysis:

| | |
|---|---|
| 99.6% by weight | $Ba(OH)_2 \cdot H_2O$ |
| 0.55% total | $BaCO_3$ |
| 0.06% | $BaSO_4$ |
| 0.0% | BaS |
| 0.03% | $SiO_2$ |
| 153 ppm | Fe |
| 306 ppm | Al |
| 3 ppm | Zn |
| 15 ppm | Pb |
| 72 ppm | Cl |

The product was in the form of small flakes and had a bulk density of 60 pounds per cubic foot and had the following size distribution: +8 mesh 1%, +60 mesh 62%, +200 mesh 76%, −200 mesh 24%.

Two "Tote-Bin" containers were loaded with 4,500 pounds each of barium hydroxide monohydrate. "Tote-Bin" (A) was loaded with barium hydroxide monohydrate produced as set forth above as it was recovered from the drum drier without the post-drying treatment. "Tote-Bin" (B) was loaded with the product from the drier produced in accordance with the present invention. Both "Tote-Bin" containers were left for a period of 18 days. Once each day during this period the bins were placed on a reciprocating platform and subjected to pulsating, vertical displacements to simulate railroad transport. This was carried out for 10 minutes a day.

At the end of the 18 days, the "Tote-Bin" containers were placed on a conventional bin vibrator used to shake up the bin to induce flow of the product during unloading. "Tote-Bin" (A), containing the conventional monohydrate from a drum drier, had formed strong agglomerates and its contents could not be discharged by the bin vibrators. The large agglomerates had to be dislodged by banging the sides of the bin with crowbars to break loose and dislodge the agglomerates in the container. "Tote-Bin" (B), which contained the product of the rotary drier produced by the instant invention, discharged freely from the "Tote-Bin" when placed on the conventional bin vibrator and yielded a free-flowing monohydrate product.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing barium hydroxide monohydrate wherein an aqueous solution of barium hydroxide containing from about 50 to about 66 percent barium hydroxide is placed in a thin film on a heated surface and water is rapidly removed from said film to yield particles containing about 97 percent barium hydroxide monohydrate, the improvement which comprises placing said particles in a heating zone and heating said particles to a temperature of from about 100° to 140° C., passing an inert sweep gas over the heated particles to remove retained water held by said particles in excess of the stoichiometric amount of water required to form barium hydroxide monohydrate and recovering as a product, free-flowing particles of barium hydroxide monohydrate having a higher $Ba(OH)_2 \cdot H_2O$ assay than the precursor particles and which remain free-flowing on standing.

2. Process of claim 1 wherein said free-flowing particles of barium hydroxide monohydrate have a $Ba(OH)_2 \cdot H_2O$ assay of at least about 99 percent.

3. Process of claim 1 wherein said sweep gas is dry air.

4. Process of claim 1 wherein said heating zone is a rotary kiln.

* * * * *